Dec. 12, 1961   S. RAPPAPORT ETAL   3,012,720
GEAR TOOTH COUNTER

Filed Dec. 15, 1958   3 Sheets-Sheet 1

INVENTORS
Sigmund Rappaport,
Harry Stuber
By Victor D. Borst
ATTORNEY

INVENTOR
Sigmund Rappaport
Harry Stuber
BY Victor D. Borst
ATTORNEY

Dec. 12, 1961  S. RAPPAPORT ETAL  3,012,720
GEAR TOOTH COUNTER
Filed Dec. 15, 1958  3 Sheets-Sheet 3
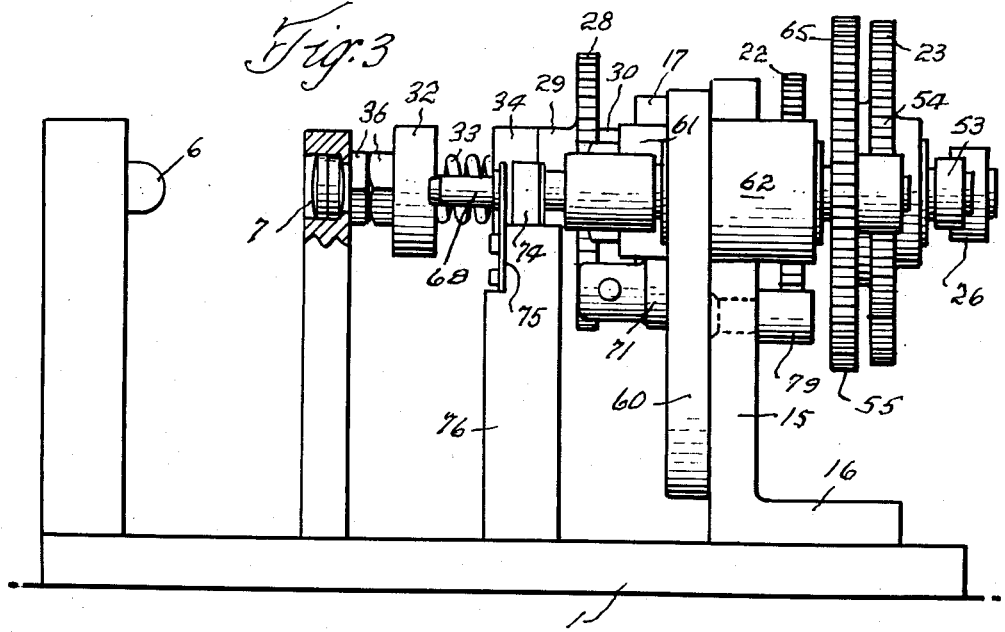
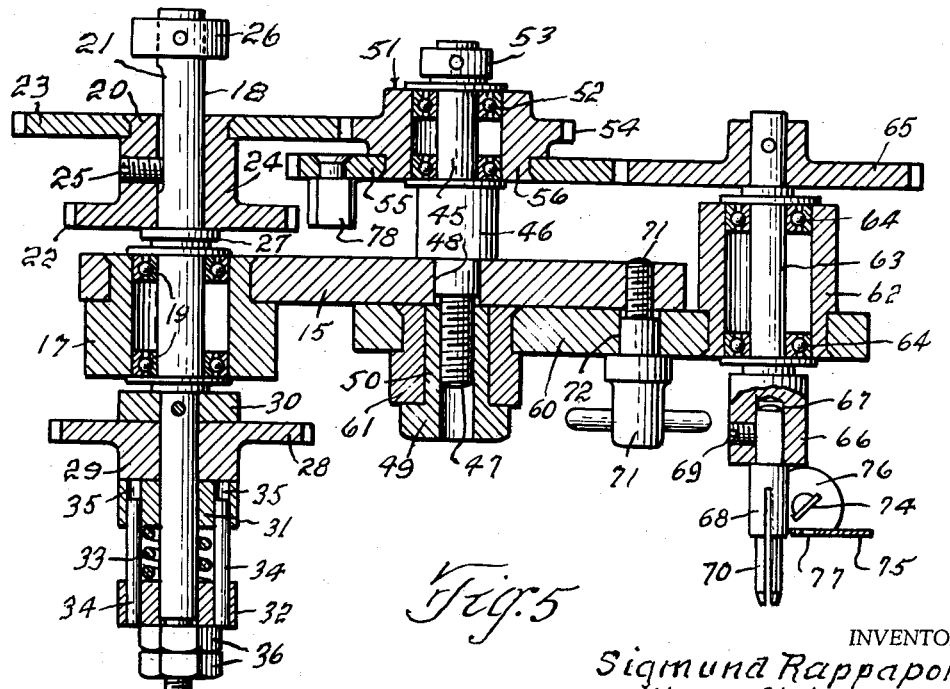
INVENTOR
Sigmund Rappaport
Harry Stuber
BY
ATTORNEY

United States Patent Office 3,012,720
Patented Dec. 12, 1961

3,012,720
GEAR TOOTH COUNTER

Sigmund Rappaport, Port Washington, and Harry Stuber, Woodhaven, N.Y., assignors to Sperry Rand Corporation, Ford Instrument Company Division, a corporation of Delaware
Filed Dec. 15, 1958, Ser. No. 780,277
12 Claims. (Cl. 235—92)

This invention relates to an apparatus for automatically, accurately and quickly ascertaining the number of teeth in a gear.

Heretofore this was done by either directly counting the teeth in a gear, or by measuring the outside diameter thereof and from this value deducing the number of teeth when the pitch is known. Both of these methods have certain inherent disadvantages. The first is slow and tedious and is susceptible to counting errors. The second method may give wrong results, because it is based on the assumption that the pitch is a standard pitch and is known and that the outside diameter is held to standard dimensions. But if the gear was cut to a bastard pitch, or if the outside diameter was for some reason or other cut over or under size, wrong deductions concerning the number of teeth will result. Also it frequently happens that the gear was produced with a wrong change-gear setting, which results not only in a wrong number of teeth but also with a wrong proportion between tooth thickness and tooth space. With my apparatus, the number of tooth spaces are accurately and automatically counted thereby avoiding all of the disadvantages of the previously used methods.

The apparatus of my invention comprises generally a frame plate which is secured to and extends upwardly from a base plate. The frame plate is provided with a fixed shaft on which a sun gear, consisting of two spur gears of different pitch diameters, is rotatably mounted adjacent the rear face of the frame plate. An arm, which is rotatably mounted on the fixed shaft adjacent the front face of the frame plate, is provided adjacent the free end thereof with a bearing in which a shaft is rotatably mounted. A planet gear, which constantly meshes with the larger spur gear of the sun gear, is pinned to the rear end of the rotatable shaft. The forward end of the rotatable shaft is provided with an adapter by which a test gear, whose teeth are to be counted, is removably secured to the rotatable shaft for rotation therewith. Clamping means is provided by which the arm is secured in adjusted positions.

The sun gear, and through it the planet gear, is adapted to be selectively driven at one of two different speeds by a cluster gear which is slidably keyed to a drive shaft which is rotatably mounted in a suitable bearing carried by the frame plate. The cluster gear consists of two spur gears of different pitch diameters, the larger of which is adapted to mesh wtih the smaller gear of the sun gear, and the smaller of which is adapted to mesh with the larger gear of the sun gear. It will thus be seen that for a fixed r.p.m. of the drive shaft the planet gear will be driven at a high or low speed depending on the particular meshing of the sun and cluster gears.

The drive shaft is driven by a reversible motor through a spur gear which is rotatably mounted on the drive shaft and is yieldingly connected thereto by a spring loaded friction clutch.

One of the spur gears of the sun gear is provided with a stop which is adapted to engage first one side and then the other side of an abutment which is secured to the frame plate in the path of the stop. In operation the sun gear is rotated in first one direction and then the other, and the ratio between the planet gear and the meshing gear of the sun gear is such that the planet gear will be rotated 360° when the sun gear travels from one stop position to the other. Just prior to the engagement of the stop with the abutment the motor is automatically cut out by means of a limit switch. After each stoppage the motor is reversed by means of a double pole double throw toggle switch.

A mask is secured to a fixed support behind the test gear and in front of an angularly disposed mirror, which is also mounted in fixed position on the support. The mask is provided with a slot the width of which is not greater than the smallest tooth space of any test gear to be handled.

An achromatic lens is mounted in front of the mask in position to condense and project the light rays from a light bulb through the mask slot and onto the mirror which in turn reflects the light against the photocell of a photoelectric control unit. The control unit actuates a digital display counter, each time a beam of light is projected onto the photocell.

In operation a test gear, whose teeth are to be counted, is placed on the adapter after which the position of the rotatably mounted arm is so adjusted that the concentrated beam of light from the achromatic lens intersects approximately at a point on the pitch line on one of the teeth of the test gear. The apparatus is then set with the stop against one side or the other of the abutment and the motor started. The test gear is then rotated at a constant r.p.m. so that successive teeth and tooth spaces of the test gear alternately intersect the beam of light from the lens. Each time a tooth space intersects the light beam the light is projected through the tooth space and mask slot against the mirror and onto the photocell whereby the control unit actuates the counter one digit.

The principal object of the invention is to provide an apparatus by which the teeth of a gear are automatically, quickly and accurately counted.

Another object of the invention is to provide an apparatus of the aforesaid character which may be used with various different size gears between upper and lower limits.

Having stated the principal objects of the invention other and more limited objects thereof will be apparent from the following specification and the accompanying drawing forming a part thereof in which:

FIG. 3 is a side elevation of the test gear holding and rotating apparatus as viewed from the line 3—3 on FIG 1;

FIG. 5 is a horizontal section taken on the line 5—5 on FIG. 2.

Figure 1:
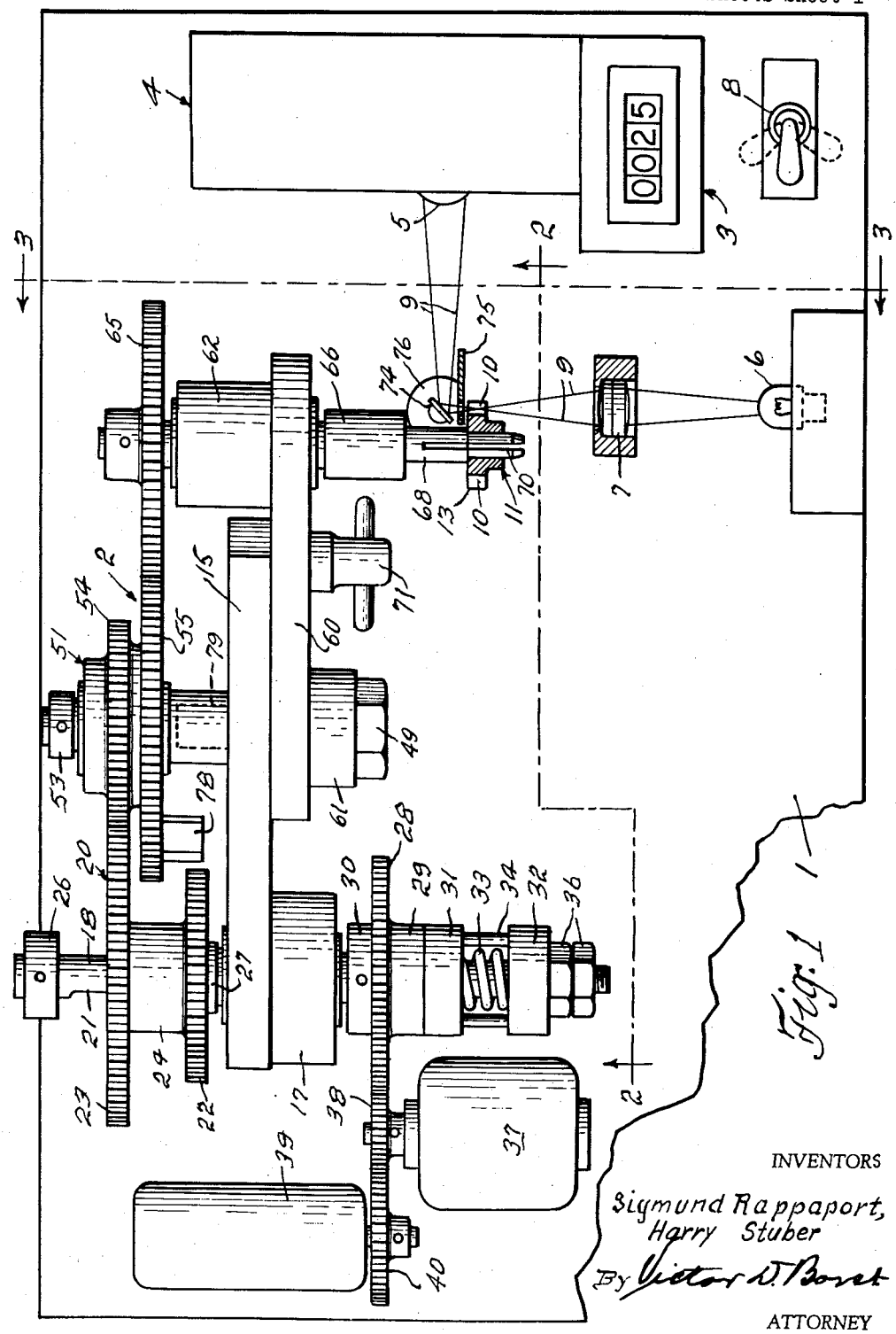
FIG. 1 is a plan view of a gear tooth counting apparatus, embodying my invention, showing it set for counting the teeth of the smallest gear capable of being handled by the apparatus.

Referring now to the drawings in detail by reference characters, the numeral 1 indicates a base plate on which the various component parts of the apparatus are mounted. The apparatus comprises generally a test gear holding and rotating apparatus 2, a digital display counter 3, a photoelectric control unit 4 having a photocell 5, a light source 6, an achromatic lens 7, and a double pole double throw toggle switch 8 by which the operation of the whole apparatus is controlled.

The achromatic lens 7 is mounted in position to project a concentrated beam of light 9, from the light source 6, through successive tooth spaces 10 of a test gear 11 being rotated by the holding and rotating mechanism 2, and onto the photocell 5 of the photoelectric control unit 4. Each time a concentrated beam of light is projected onto the photocell 5 the photoelectric control unit 4 is rendered operative to advance the digital display counter 3 one digit. The mounting of the lens 7 is such that the beam of light 9 is focused at a spot on the pitch line 12 of the test gear 11 in order to obtain the maximum light intensity. As the test gear 11 is rotated the teeth 13 thereof successively intercept the beam of light 9 being projected against the photocell 5 by the lens 7, while the tooth spaces 10 permit the beam 9 to pass therethrough and onto the photocell 5. It will therefore be seen that the number of teeth 13 on the gear 11 is determined by counting the tooth spaces 10, there being one tooth space 10 for each tooth 13.

The digital display counter 3, the photoelectric control unit 4 having the photocell 5, the light source 6, the achromatic lens 7, and the double pole double throw toggle switch are well-known standard commercially available units. Consequently it is not believed necessary to show and describe them in more detail herein.

The test gear holding and rotating mechanism 2 comprises a vertically disposed frame plate 15 which is secured to the base plate 1 by a bracket arm 16. Adjacent one end thereof the frame plate 15 is provided with a bushing 17 in which a drive shaft 18 is rotatably mounted by means of ball bearings 19. The shaft 18 which extends out beyond the front and rear faces of the frame plate 15 has a cluster gear 20 slidably mounted thereon, rearwardly of the frame plate 15, and is provided with a flattened section 21. The cluster gear 20 consists of a spur gear 22 and a larger spur gear 23, both of which are mounted on a hub 24. A set screw 25 carried by the hub 24 is adapted to engage the flattened section 21 of the shaft 18 to secure the cluster gear 20 to the shaft 18 for rotation therewith and to maintain the cluster gear in adjusted position. Collars 26 and 27 limit the movement of the cluster gear 20 in each direction.

A spur gear 28 having a hub 29 is rotatably mounted on the shaft 18, forwardly of the frame plate 15, between a Bakelite disk 30, which is pinned on the shaft 18, and a Bakelite disk 31 which is slidably mounted on the shaft 18. A collar 32 is slidably mounted on the shaft 18 in spaced relation to the disk 31, with a coiled compression spring 33 disposed about the shaft 18 between the disk 31 to collar 32. The collar 32 carries a pair of pins 34 which extend into apertures 35 in the disk 31, whereby the disk 31 and collar 32 are constrained to rotate in unison. The collar 32 is retained upon the shaft 18 by a pair of nuts 36 and is adjustable back and forth thereon by the nuts 36. The pressure of the spring 33, and consequently the pressure with which the gear 28 is gripped between the disks 30 and 31, may be varied by adjusting the position of the collar 32 by the nuts 36. It will therefore be seen that the parts 30 to 36 constitute an adjustable friction disk clutch by which the gear 28 is yieldingly connected to the shaft 18. The shaft 18 is adapted to be rotated in either direction through the gear 28 by a reversible motor 37 and motor pinion 38. The motor 37 also drives a limit switch mechanism 39 through the pinion 38 and a gear 40 carried by the limit switch mechanism 39. The limit switch mechanism 39 is of standard construction. Consequently it is not shown and described in detail herein. Many different types are commercially available, any one of which can be used equally well herein.

A stud shaft 45 having an enlarged mid-section 46 and a threaded forward end 47 is non-rotatably secured in an aperture 48 in the frame plate 15 by a nut 49 having an elongated interiorly threaded cylindrical hub 50. A sun gear 51 is rotatably mounted by ball bearings 52 upon the rear end of the shaft 45 and is retained in fixed position by a collar 53. The sun gear 51 consists of a spur gear 54 and a larger spur gear 55 which is secured to the hub 56 of the gear 54. The sun gear 51 is adapted to be driven at either one of two selected speeds by the cluster gear 20 in order to accommodate different capacities of counter 4. When the larger gear 23 of the cluster gear 20 is in mesh with the smaller gear 54 of the sun gear 51 as shown herein the sun gear is driven at the higher speed. When it is desired to drive the sun gear at the lower speed the cluster gear 20 is adjusted rearwardly on the shaft 18 until the smaller gear 22 thereof is in mesh with the larger gear 55 of the sun gear 51. Collar 26 facilitates this setting, limiting the rearward motion of the cluster gear 20.

Figure 2:
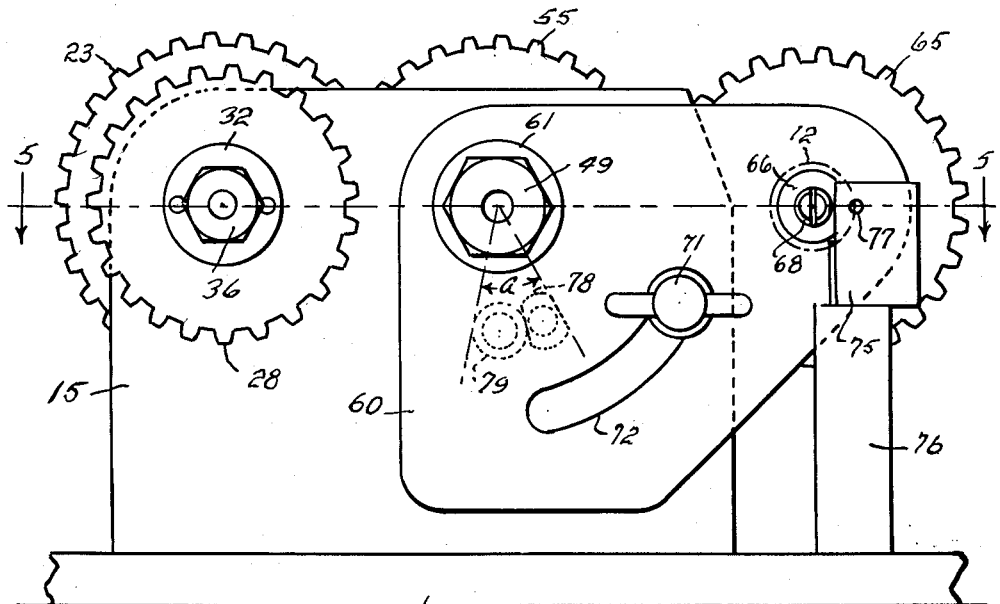
FIG. 2 is a front elevation of the test gear holding and rotation mechanism as viewed from the line 2—2 on FIG. 1.

An arm 60 is rotatably mounted upon the elongated hub 50 of the nut 49 by means of a bushing 61 which is carried by the arm 60 adjacent one end thereof. The free end of the arm 60 is provided with a bushing 62 in which a shaft 63 is rotatably mounted by means of ball bearings 64. The shaft 63 has a gear 65 pinned on the rear end thereof which permanently meshes with the larger gear 55 of the sun gear 51. The enlarged forward end 66 of the shaft 63 is provided with a bore 67 in which an adapter 68, by which a test gear the teeth of which are to be counted is removably secured to the shaft 63 for rotation therewith, is removably secured by means of a set screw 69. The arm 60 is adapted to be moved back and forth between the positions shown in FIGS. 2 and 4 in accordance with the size of the test gear mounted on the adapter 68, the teeth of which are to be counted. The adapter 68 is slotted as shown at 70 in order to frictionally hold a test gear thereon for rotation with the shaft 63 and adapter 68. The arms 60 is adapted to be held in adjusted positions between the positions shown in FIGS. 2 and 4 by a set screw 71 which is carried by the frame plate 15 and extends through an arcuate slot 72 in the arm 60 which is concentric with the axis of rotation of the arm 60.

Figure 4:
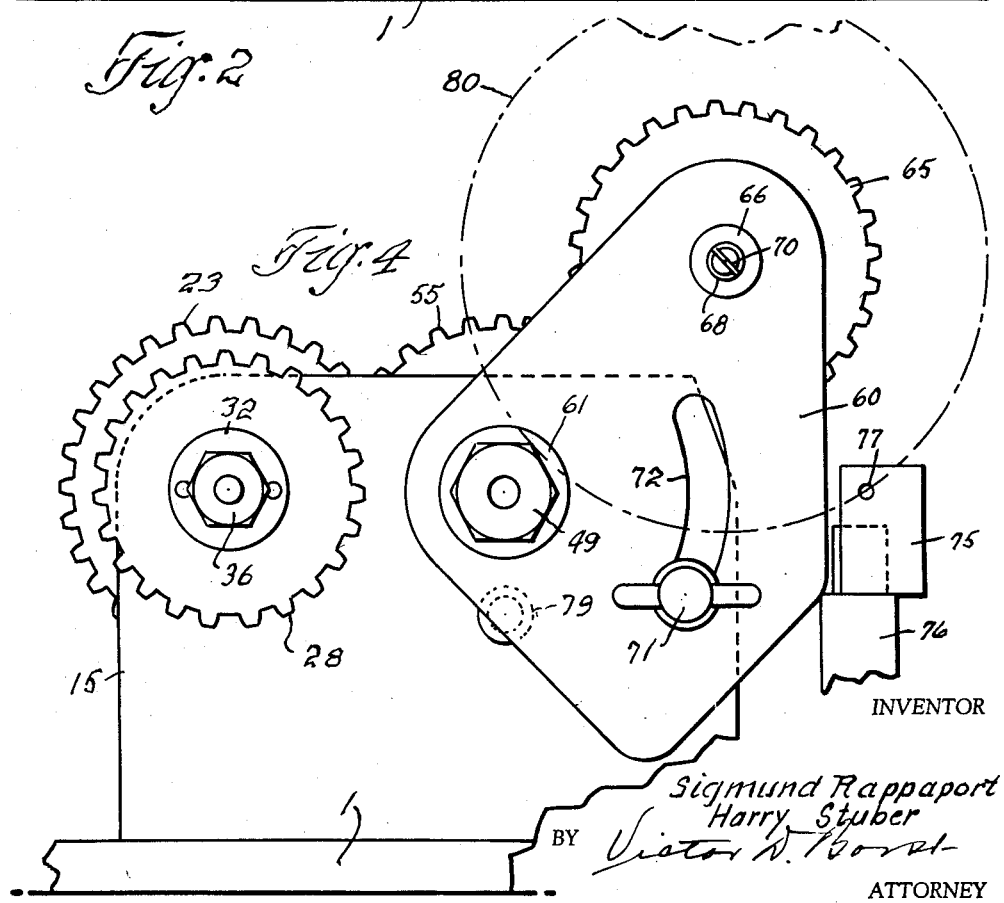
FIG. 4 is a view similar to FIG. 2 showing the mechanism set for counting the teeth of the largest gear capable of being handled by the apparatus.

A mask 75 is mounted in fixed position behind the test gear 11 upon a support 76 which is secured to the base plate 1 and extends upwardly therefrom. The mask 75 is provided with an aperture 77 the area of which is not greater than the area of any tooth space of any test gear accommodated by the apparatus. An angularly disposed mirror 74 is also mounted in fixed position on the support 76 behind the mask 75 in line with the lens 7. The lens 7, aperture 77 and mirror 74 are so positioned with respect to the test gear 11, that the beam of light 9 will be focused as a point on the pitch line 13 of the smallest test gear 11 which can be accommodated by the apparatus before passing through the aperture 77 onto the mirror 74 by which it is reflected onto the photocell 5. By adjusting the arm 60, between the positions shown in FIGS. 2 and 4, test gears having a larger pitch diameter 80 than that of the test gear 11 shown may be so positioned that the pitch line 80 thereof will intersect the beam of light 9 between the lens 7 and aperture 77 as shown in FIG. 4.

The larger gear 55 of the sun gear 51 carries a stop 78 which is adapted to engage first one side and then the other side of a fixed abutment 79 which is secured to the frame plate 15 in the path of the stop 78. The gears 55 and 65 are so proportioned that the gear 65, and consequently the shaft 63 and a test gear secured thereto, will be rotated 360° each time the stop 78 is rotated by the gear 55 from one side of the abutment 79 to the other side thereof. As shown herein the angle "a" (FIG. 2) is 40°. Therefore the gear 65 will be rotated 360° for each 320° rotation of the gear 55 in either direction. The ratio between the gears 55 and 65 is therefore nine to eight in which the gear 55 has sixty-three teeth and the gear 65 has fifty-six teeth. In counting the teeth of test gears having one hundred teeth or more the cluster gear 20 is so adjusted that the smaller gear 22 thereof is in mesh with the larger gear 55 of the sun gear 51; and in counting the teeth to test gears having less than one hundred teeth the cluster gear 20 is so adjusted that the larger gear 23 thereof is in mesh with the smaller gear 54 of the sun gear 51.

In operation the apparatus is set with the stop 78 in engagement with one side of the abutment 79. A test gear the teeth of which are to be counted, is mounted on the adapter 68 and the arm 60 is adjusted until the beam of light falls upon a tooth. The switch 8 is then set in position to effect rotation of the motor 37 in a direction to move the stop 78 away from engagement with one side of the abutment 79 and into engagement with the other side thereof. As successive tooth spaces on the test gear intersect the beam of light 9 it is projected through the tooth space and the aperture 77 and against the mirror 74 by which it is reflected onto the photocell 5. Each time the beam of light 9 impinges on the photocell 5 the photoelectric control unit 4 advances the counter 3 one digit, it being understood that as successive gear teeth of the test gear intersect the beam of light it is blocked off from impinging on the photocell. The number of gear teeth in a test gear is therefore determined by counting the number of tooth spaces in a test gear.

Successive test gears are rotated in opposite directions during counting as determined by the setting of the switch 8.

Just prior to the engagement of the stop 78 with the abutment 79, in either direction, the limit switch 39 cuts out the motor 37, and the friction disk clutch mechanism through which the drive shaft 18 is driven permits overrunning of the motor 37 due to inertia and prevents any bouncing or rebounding of the mechanism 2.

From the foregoing it will be apparent to those skilled in this art that I have provided a very simple and efficient apparatus for quickly and accurately automatically determining the number of teeth in a test gear.

It is to be understood that I am not limited to the specific construction shown and described herein as various modifications may be made therein within the spirit of the invention and the scope of the appended claims. For instance the mask 75 may be interposed between the lens 7 and the test gear 11 instead of between the test gear 11 and the mirror 74, in which case the beam of light 9 will be projected first through the slot in the mask, then through successive tooth spaces of the test gear and onto the mirror 74 and photocell 5.

What is claimed is:

1. A gear tooth counting apparatus of the character described comprising lens means by which a concentrated minute beam of light is projected along a fixed path onto a photoelectric cell, test gear holding and rotating mechanism by which various different size test gears, the teeth of which are to be counted, may be so positioned with respect to said light path that the pitch line of a gear being tested continuously intersects said light path as said test gear is rotated, whereby said beam of light is intersected by successive teeth of said test gear; a display counter which is adapted to be advanced one increment by said photoelectric cell each time said beam of light is intersected by a gear tooth; said test gear holding and rotating mechanism comprising a vertically disposed frame plate, and a transversely extending pivot shaft carried by said frame plate, an intermediate gear rotatably mounted on said pivot shaft, drive means by which said intermediate gear is selectively rotated in either direction, an adjustable arm rotatably mounted on said pivot shaft, means by which said arm is clamped in adjusted positions, a rotatably mounted shaft carried by said arm adjacent the free end thereof, a planet gear secured to one end of said rotatably mounted shaft in mesh with said intermediate gear through which said rotatably mounted shaft is rotated by said intermediate gear, and an adapter carried by the opposite end of said shaft by which said test gear is secured to said rotatably mounted shaft for rotation therewith.

2. A gear tooth counting apparatus as defined in claim 1 in which said intermediate gear has a stop secured thereto which is adapted to engage first one side and then the other side of a fixed abutment which is secured to said frame plate in the path of said stop, and in which the ratio between said intermediate gear and said planet gear is such that said planet gear is rotated 360° when said intermediate gear is rotated from one stop position to the other.

3. A gear tooth counting apparatus as defined in claim 2 in which said drive means is also operative to selectively rotate said intermediate gear at a higher or lower speed.

4. A gear tooth counting apparatus of the character described comprising lens means by which a concentrated minute beam of light is projected along a fixed path onto a photoelectric cell, test gear holding and rotating mechanism by which various different size test gears, the teeth of which are to be counted, may be so positioned with respect to said light path that the pitch line of a gear being tested continuously intersects said light path as said test gear is rotated, whereby said beam of light is intersected by successive teeth of said test gear; a display counter which is adapted to be advanced one increment by said photoelectric cell each time said beam of light is intersected by a gear tooth; said test gear holding and rotating mechanism comprises pivot means which is disposed in fixed position with respect to said light path, an adjustable arm rotatably mounted on said pivot means, means by which said arm is clamped in adjusted positions, a rotatably mounted test gear shaft carried by said arm adjacent the free end thereof, a test gear holder carried by said test gear shaft, and drive means by which said test gear shaft is rotated; and means by which the operation of said drive means is automatically stopped after each 360° rotation of said test gear shaft.

5. A gear tooth counting apparatus of the character described comprising lens means by which a concentrated minute beam of light is projected along a fixed path onto a photoelectric cell, test gear holding and rotating mechanism by which various different size test gears, the teeth of which are to be counted, may be so positioned with respect to said light path that the pitch line of a gear being tested continuously intersects said light path as said test gear is rotated, whereby said beam of light is intersected by successive teeth of said test gear; a display counter which is adapted to be advanced one increment by said photoelectric cell each time said beam of light is intersected by a gear tooth; said test gear holding and rotating mechanism comprises pivot means which is disposed in fixed position with respect to said light path, an adjustable arm rotatably mounted on said pivot means, means by which said arm is clamped in adjusted positions, a rotatably mounted test gear shaft carried by said arm adjacent the free end thereof, a test gear holder carried by said test gear shaft, and drive means by which said test gear shaft is rotated; said drive means being operative to rotate said test gear shaft in first one direction and then in the opposite direction.

6. A gear tooth counting apparatus as defined by claim 5 in which means are provided by which the operation of said drive means is automatically stopped and reversed after each 360° rotation of said test gear shaft in either direction.

7. A gear tooth counting apparatus of the character described comprising a counting mechanism which is mounted in fixed position and is operative to count successive teeth on a test gear as said test gear is rotated, a test gear holding and rotating mechanism by which various different size gears, the teeth of which are to be counted, may be operatively positioned with respect of said counting mechanism; said holding and rotating mechanism comprising a vertically disposed frame plate, a transversely extending pivot shaft carried by said frame plate, an intermediate gear rotatably mounted on said pivot shaft, drive means by which said intermediate gear is selectively rotated in either direction, an adjustable arm rotatably mounted on said pivot shaft, means by which said arm is clamped in adjusted positions, a rotatably mounted shaft carried by said arm adjacent the free end thereof, a planet gear secured to one end of said rotatably mounted shaft in mesh with said intermediate gear through which said rotatably mounted shaft is rotated by said intermediate gear, and an adapter carried by the opposite end of said shaft by which said test gear is secured to said rotatably mounted shaft for rotation therewith.

8. A gear tooth counting apparatus as defined in claim 7 in which said intermediate gear has a stop secured thereto which is adapted to engage first one side and then the other side of a fixed abutment which is secured to said frame plate in the path of said stop, and in which the ratio between said intermediate gear and said planet gear is such that said planet gear is rotated 360° when said intermeidate gear is rotated from one stop position to the other.

9. A gear tooth counting apparatus as defined in claim 8 in which said drive means is also operative to selectively rotate said intermediate gear at a higher or lower speed.

10. A gear teeth counting apparatus of the character described comprising a vertically disposed frame plate, a transversely extending pivot shaft carried by said plate, an intermediate gear rotatably mounted on said pivot shaft, a rotatably mounted drive shaft carried by said frame plate adjacent said pivot shaft, power means by which said drive shaft is selectively rotated first in one direction and then in the opposite direction, interengaging gear means between said drive shaft and said intermediate gear through which said intermediate gear is rotated by said power shaft, an angularly adjustable arm rotatably mounted on said pivot shaft, means by which said arm is clamped in adjusted position, a rotatably mounted test gear shaft carried by said arm adjacent the free end thereof, a spur gear secured to one end of said test gear shaft in constant mesh with said intermediate gear through which test gear shaft is rotated by said intermediate gear, means by which a test gear the teeth of which are to be counted is removably secured to said test gear shaft for rotation therewith, a counter by which the number of teeth on a test gear is visually indicated, and means by which said counter is actuated by the rotation of said test gear.

11. A gear tooth counting apparatus as defined by claim 10 in which means are provided by which said intermediate gear is rotated by said drive shaft at a selected one of a plurality of different speeds.

12. A gear tooth counting apparatus as defined by claim 10 in which said intermediate gear has a stop secured thereto which is adapted to engage first one side and then the other side of a fixed abutment which is secured to said frame plate in the path of said stop, and in which the ratio between said intermediate gear and said spur gear is such that said spur gear and with it said test gear shaft are rotated 360° when said intermediate gear is rotated from one stop position to the other.

References Cited in the file of this patent

UNITED STATES PATENTS

| | | |
|---|---|---|
| 1,084,632 | Heuser | Jan. 20, 1914 |
| 2,470,926 | Gieseke | May 24, 1949 |
| 2,656,106 | Stabler | Oct. 20, 1953 |
| 2,685,082 | Beman et al. | July 27, 1954 |
| 2,789,445 | Kaufmann et al. | Apr. 23, 1957 |

FOREIGN PATENTS

| | | |
|---|---|---|
| 463,417 | Canada | Feb. 28, 1950 |